Sept. 20, 1955 M. APSTEIN 2,718,224
MINIATURE DIRECT-WRITING ELECTROCARDIOGRAPH
Filed July 1, 1952 2 Sheets-Sheet 1

INVENTOR
Maurice Apstein
Max L. Libman
ATTORNEY

Sept. 20, 1955    M. APSTEIN    2,718,224
MINIATURE DIRECT-WRITING ELECTROCARDIOGRAPH
Filed July 1, 1952    2 Sheets-Sheet 2

INVENTOR
Maurice Apstein
BY Max L. Libman
ATTORNEY

United States Patent Office 2,718,224
Patented Sept. 20, 1955

2,718,224

MINIATURE DIRECT-WRITING ELECTRO-CARDIOGRAPH

Maurice Apstein, Bethesda, Md.

Application July 1, 1952, Serial No. 296,577

9 Claims. (Cl. 128—2.06)

This invention relates to electrocardiographs and has for its primary object the provision of a small, direct-writing electrocardiograph suitable for portable operation.

A further object is to provide in a portable machine a permanent record of exactly the same type as present standard machines which can be immediately interpreted by one accustomed to present machines without further training, and which has the advantage of being useful, without further processing, for projection on a screen at any desired enlargement for lecture or demonstration purposes.

An important advantage of my invention lies in the provision of a portable instrument which satisfies the apparently contradictory requirements of direct readability and extreme compactness.

Further advantages of my improved instrument are that it is simple, relatively inexpensive and inherently rugged, which is very important in a portable instrument, as there are no delicate or highly stressed parts which would be liable to failure due to the shocks to which a portable instrument is necessarily subjected.

Other objects and advantages will become apparent as the description proceeds. My invention consists in certain features of construction, combination, procedure and arrangement of parts and functions which will be described more fully below by way of example only, with particular reference to the drawings, in which.

Figure 1:
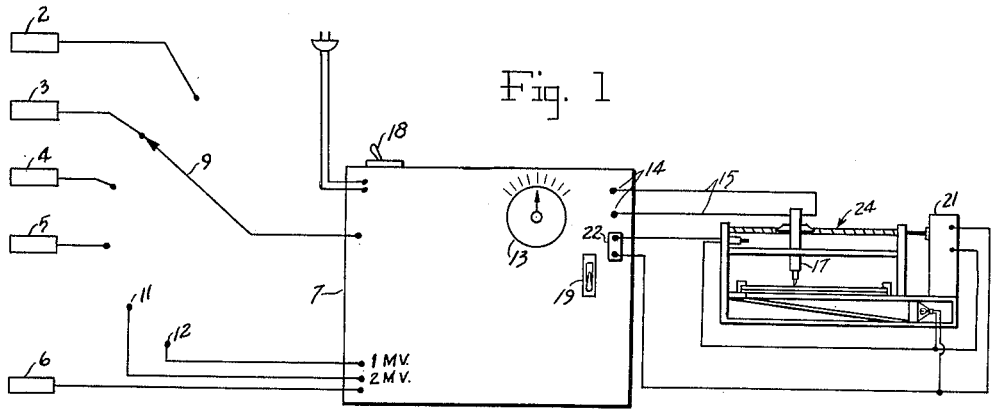
Fig. 1 is a schematic diagram of an electrocardiograph constructed in accordance with my invention with the optical viewer removed for clarity.
Figure 2:
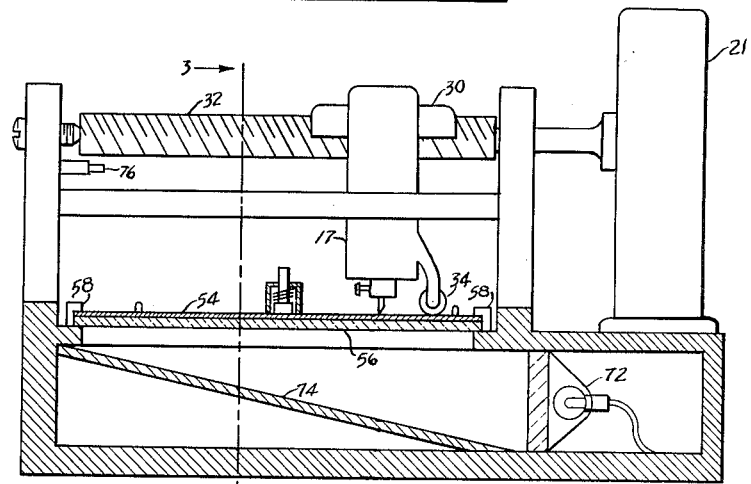
Fig. 2 is an enlarged front elevation view, partly taken in section along line 2—2 of Fig. 3, of the graph recorder shown in Fig. 1, with the optical viewer in place.

Referring to Fig. 1, reference characters 2, 3, 4, 5, and 6 designate a set of conventional electrodes for an electrocardiograph. These electrodes are attached to the patient in the conventional manner so as to make good contact with the skin. It is then desired to make recordings of the potential produced between various sets of electrodes. These potentials vary during heartbeat in a manner which gives the skilled diagnostician the required information. Electrode 6 is connected directly to the amplifier 7. A selector switch 9 is provided for selecting in turn the desired one of electrodes 2-5 for recording. This switch has additional contacts 11 and 12 which connect a standard calibrating voltage to the input of the amplifier. Two calibrating voltages of one and two millivolts are shown by way of example, it being customary to use a scale of one millivolt per centimeter in taking the graphical record. A gain control for the amplifier is shown at 13. This is used to adjust the output of the amplifier so that when the selector switch 9 is set at contacts 11 and 12 respectively, the corresponding outputs on the record device which will be described below can be adjusted to those marks on my graph which correspond to the one and two centimeter marks on the standard electrocardiograph record. The amplified output appears at terminals 14 and is fed by means of leads 15 to a record cutter 17 which is essentially similar to a standard phonograph record cutter. A conventional switch 18 is provided for the amplifier, and an additional switch 19 may be provided to control the power supply to a standard motor 21 for the cutter head for which purpose a suitable outlet may be provided at 22. The recording device is shown at 24 and will be described in greater detail with reference to Fig. 2.

Cutter assembly 17 is mounted on slider arm 26 which is supported by and slides freely on polished shaft 28. At the center of the slider arm is the half-nut 30 which ordinarily rests by gravity on and in cooperation with screw-threaded shaft 32 which is driven by motor 21 during the taking of the record. When the half-nut is in engagement with shaft 32 and the motor is energized, the entire slider arm assembly moves smoothly at a uniform rate from the motor end of the shaft toward the opposite end.

Figure 3:
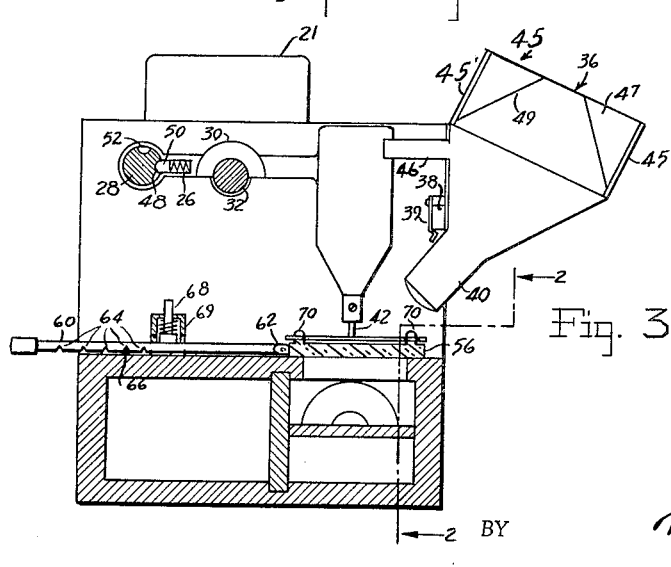
Fig. 3 is a sectional view taken along line 3—3 of Fig. 2.
Figure 4:
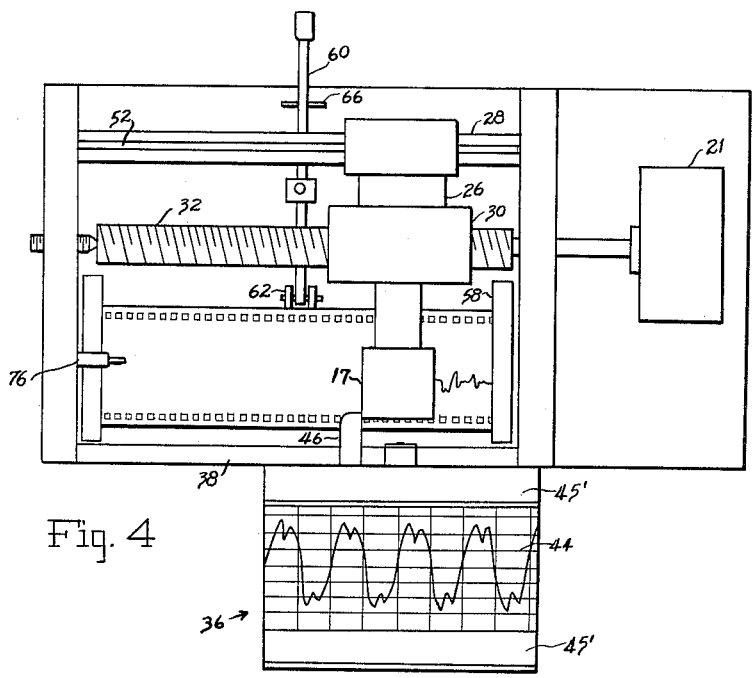
Fig. 4 is a plan view of the graph recorder with the optical viewer in place.

The slider arm carries at its free end the cutter assembly 17, consisting of an electrically operated cutting stylus. A conventional adjustable depth wheel 34 is provided to limit the depth of the cut, which for this purpose may be made extremely shallow, so that little driving force is required. A small projecting viewer 36 (Fig. 3) is mounted on slide bar 38 for lateral sliding motion thereon. The viewer is mounted on the slide bar 38 in removable fashion by means of spring clip 39 so that it can be easily snapped on and off the bar 38 but is slideable thereon. Thus the viewer can be removed from the slide bar and stored in a suitable compartment of a carrying case for the entire machine. This viewer has a lens system at 40 focused just behind the cutting needle 42 so that its field of view is the trace being made by the needle. This field of view is projected on a translucent screen or plate 44, so that a magnified image of the portion of the record being made by the apparatus is seen by the user on the front side of screen 44, as indicated in Fig 4. A conventional folding hood 45 is provided, comprising two foldable, rigid end flaps 45' and two flexible fabric side flaps 47 creased at 49 (Fig. 3) so that the entire hood can be folded flat on top of screen 44 to protect the screen during transportation, the view with hood folded being conveniently small for transportation and storage. The magnification is made such that the projected record on the screen 44 is of conventional dimensions, that is to say, about 2½ inches wide (top to bottom), which is the standard width of the record strip usually employed. Any portion of the record can be examined through the projection viewer, as will be more fully explained below, but during the process of making a record, as the cutter head 17 moves away from the motor 21, it carries view 36 along with it by virtue of lug 46 which projects from the viewers, so that the latter moves along its slide bar 38 together with the cutter head, and the field of view remains the area on which a record is currently being made.

Slider shaft 28 is provided with a side groove 48 with which a slidable detent 50 shown as a spring-pressed ball cooperates to positively hold slider arm 26 in the horizontal position shown in the figure. This serves to prevent bouncing or jiggling of the cutting assembly during operation. A top groove 52 is provided in the slider shaft so that the cutter assembly may be swung up into the vertical position to enable free access to the record being made for insertion or removal of the record strip which will be described below, and also to enable the projecting view 36 to be slid laterally so that any portion of the record may be examined without interference by the cutter head assembly against lug 46. The upright position of the assembly also permits insertion or removal of cutting needles and does not interfere with lateral sliding of the cutter head assembly.

The record to be cut by the above equipment is preferably a strip of 35 mm. film 54, which need be only in the order of three inches long. Since the record is reduced by a factor of twenty, it is easily possible to obtain five separate traces on such a strip of film. I provide for this by sliding the film strip laterally of the cutting head and locking it into any of the five different positions. For this purpose the film strip 54 is mounted on a transparent or translucent holder 56 which is transversely slidable in guides 58. A push arm 60 is hingedly connected to holder 56 at 62 and is provided with five detent grooves 64 capable of cooperation with detent 66 to hold the film guide in the desired five transverse locations for cutting five separate records on film strip 54, it being understood that the number five is by way of example only and that any other desired practicable number of traces may be made. A spring element, shown as a plunger 68, urged downwardly by spring 69 holds the push arm 60 in the selected transverse position by keeping the selected detent groove 64 in contact with detent 66.

The film strip is securely held in transparent or translucent holder 56 which is provided with locating pins 70 cooperating with some of the usual sprocket holes at the sides of the film to prevent any possibility of the film shifting while the record is taken. A light source 72 is provided together with a diffusing reflecting surface 74 arranged to provide uniform illumination from below the film strip so that the record can be viewed as it is taken.

The film strip 54 is provided with a very thin opaque surface through which the cutter can readily penetrate, so that the cutter as it moves, removes the thin opaque surface to leave a well-defined trace which is easily visible when suitably amplified and illuminated either directly or from behind as shown. A grid of squares is provided on the surface of the film, which may be done photographically, as the whole opaque surface may be photographically applied, the squares being reduced in size proportionally to the optical magnification. Alternately, the opaque layer may be printed on the surface of the film, together with the necessary grid pattern, or it may be applied in any other known manner. In any event, the surface of the film should be either partly or wholly opaque, except for the grid pattern, and should be of a material which is cleanly removed by the cutter so that a good clean line is produced which is readily distinguished against the opaque or gray background. The cutter is preferably chisel shaped, being approximately 0.002 inch wide and less than 0.001 inch thick at its cutting edge to produce the conventional type of trace recognizable to users of these instruments and to permit visual separation of high-amplitude, high frequency trace components.

A limit switch 76 is provided and is so located that it will be opened when the cutter assembly reaches the end of its travel to cut off the motor 21, thus preventing the possibility of damage. The cutter is then lifted by hand, indexed to the next position, and returned to the front end of its travel stroke for the taking of another record. When the trace is completed, the cutter assembly can be swung out of the way and the film removed. The film strip, with its five traces will contain the same amount of record information as over twelve feet of conventional electrocardiograph strip. It can be readily filed by being clipped directly to the patient's record card. It can be studied while another record is being taken by putting it into a conventional film viewer, such as ordinarily used with miniature colored slides or films, this being an inexpensive battery operated device which is readily obtainable in the proper size for 35 mm. film. The record is permanent and requires no development or other treatment for immediate use. Due to the small amplitude of the trace formed by the cutter, very little energy is required, so that a small amplifier may be used, which means that the size of the entire apparatus may readily be made small enough for portability. If desired, a battery may be readily incorporated into the carrying case so that the equipment is entirely self-contained, or it may be operated from any standard house current supply. The proportions of the standard electrocardiogram are maintained so that no additional training of the user is required, and since the scale is a permanent part of the record, it may be enlarged to any desired size without impairing its readability. It will be noted that the speed of the cutter head must of course be one-twentieth of the customary recording speed if a one-twentieth scale is used on the film, as I propose in the example given, in order to maintain the standard proportions. This means that the speed will be 1.25 mm. per second instead of the usual 2.5 cm.

Figure 5:
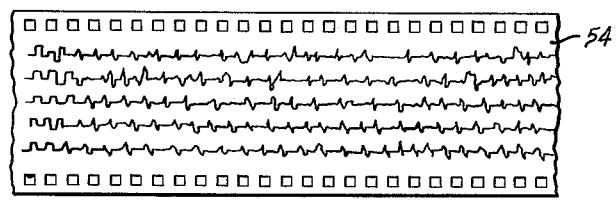
Fig. 5 is a negative of an electrocardiograph made in accordance with my invention.
Figure 6:
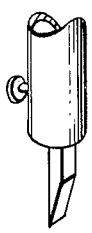
Fig. 6 is an enlarged perspective view of the chisel-shaped stylus.

Fig. 5 shows a negative of a portion of the film strip, that is, instead of white on black, the trace is shown as black against a white background for ease of presentation on paper. However, it will be understood that the actual film will show a white line on a dark background. The square pulses at the beginning of each record trace in Fig. 5 are the calibrating pulses, and provide a self-checking record to show that the gain was correctly adjusted at the beginning of the trace, in accordance with the standard procedure for this operation.

It will be apparent that instead of a white line on a black record, it is possible to produce a dark line on a light-colored record by having a thin light-colored layer on a black material, so that when the white is cut away a black line shows. In this case, of course, it will not be possible to shine light through the record, but it must be viewed by reflected light, so that the illuminating lamp would be mounted on the same side of the film as the microscope. A suitable projector of the "magic lantern" type could be used for enlarged projection onto a screen for lecture or demonstration purposes.

It will now be apparent that I have described an apparatus which overcomes the disadvantages of the prior art devices, which provides an immediate, permanent electrocardiogram which can be viewed while it is being made or at any later time, on any desired scale, which is inexpensive to make and to operate, which can be made readily portable and is inherently rugged to withstand portable use, and which provides a standard record which is acceptable to the medical profession and can be compared directly with present records of this type.

I claim:

1. Apparatus for producing records of physiological potentials for electromedical diagnostic use, said records being of standard proportions, comprising body contact electrodes, an amplifier for amplifying body potentials picked up by said electrodes, a record cutter having a cutter head actuated by the output of said amplifier, a film holder for positioning a strip of film beneath said cutting head for recording thereby, means for producing uniform relative motion between said film and said cutting head for recording a trace on said film as said head is actuated by said amplifier.

2. The invention defined in claim 1, including an enlarging display viewer mounted on said cutting head for displaying an enlargement of said trace as it is cut.

3. The invention defined in claim 2, wherein said film holder is of a light-transmitting material, and a source of illumination positioned on the opposite side of said film from said head.

4. The invention defined in claim 3, and a travel-limiting device for automatically stopping said relative motion as said head nears the end of a strip of film positioned in said holder.

5. The invention defined in claim 1, and an indexing device for positioning said head and film relative to each other laterally of the direction of said relative motion.

6. The invention defined in claim 1, and a strip of film material positioned in said film holder, said film having a layer of visually contrasting material on the side toward said cutting head, and means for positioning said record cutter so as to remove a line of said layer material as the record is being cut, whereby a visually observable trace is produced.

7. The invention defined in claim 1, including a strip of light-transmitting film positioned in said film holder, said film having a layer of opaque material on the side toward said cutting head and means for positioning said record cutter so as to remove a line of said opaque material as the record is being cut whereby a light-transmitting trace is produced.

8. The invention defined in claim 1 and a strip of dark film material positioned in said film holder, said film having a layer of light-colored material on the side toward said cutting head, and means for positioning said record cutter so as to remove a line of said opaque material as the record is being cut, whereby a visually observable trace is produced.

9. The invention defined in claim 1, and a strip of opaque, light-colored film material positioned in said film holder, said film having a layer of dark-colored material on the side toward said cutting head, and means for positioning said record cutter so as to remove a line of said opaque material as the record is being cut, whereby a light-reflecting trace is produced.

References Cited in the file of this patent

UNITED STATES PATENTS 2,506,500     Hardy _____ May 2, 1950

OTHER REFERENCES

"Medical Physics," edited by Otto Glasser, published by Year Book Publishers, Inc., Chicago, Illinois (1944), pages 355, 356, 359 and 360. Copy in Division 55.